US012683681B2

(12) United States Patent
Chang

(10) Patent No.: US 12,683,681 B2
(45) Date of Patent: Jul. 14, 2026

(54) OPTICAL BACKPLANE SWITCHOVER METHOD AND OPTICAL COMMUNICATION DEVICE

(71) Applicant: HUAWEI TECHNOLOGIES CO., LTD., Shenzhen (CN)

(72) Inventor: Shifan Chang, Dongguan (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 286 days.

(21) Appl. No.: 18/648,077

(22) Filed: Apr. 26, 2024

(65) Prior Publication Data

US 2024/0275479 A1    Aug. 15, 2024

Related U.S. Application Data

(63) Continuation of application No. PCT/CN2022/130204, filed on Nov. 7, 2022.

(30) Foreign Application Priority Data

Nov. 12, 2021    (CN) .......................... 202111339864.2

(51) Int. Cl.
*H04B 10/032* (2013.01)
*H04B 10/25* (2013.01)
*H04Q 11/00* (2006.01)

(52) U.S. Cl.
CPC ........... *H04B 10/032* (2013.01); *H04B 10/25* (2013.01); *H04Q 11/0062* (2013.01); *H04Q 2011/0081* (2013.01)

(58) Field of Classification Search
CPC ........ H04B 10/032; H04B 10/25; H04Q 1/02; H04Q 1/20; H04Q 1/22; H04Q 1/30;
(Continued)

(56) References Cited

U.S. PATENT DOCUMENTS 5,533,188 A    7/1996   Palumbo
2002/0159678 A1*  10/2002   Derventzis ......... H04Q 11/0005
385/16

(Continued)

FOREIGN PATENT DOCUMENTS

CN    105376659 A    3/2016

OTHER PUBLICATIONS

Alexei L. Glebov et al., "Integration technologies for pluggable backplane optical interconnect systems," Jan. 16, 2007, Optical Engineering 46(1), 015403 , Jan. 2007, pp. 015403-1-15403-8.*

(Continued)

*Primary Examiner* — Omar S Ismail
(74) *Attorney, Agent, or Firm* — Leydig, Voit & Mayer, Ltd.

(57)    ABSTRACT

Embodiments of this disclosure disclose an optical backplane switchover method and an optical communication device. Each optical signal processing board in the optical communication device is connected to at least two optical backplanes, where a first optical backplane is a currently working optical backplane, and a second optical backplane is a spare optical backplane. If a first optical link on the first optical backplane is faulty, a selector switch on the optical signal processing board is controlled to perform switching, to disconnect the optical signal processing board from the first optical backplane and connect the optical signal processing board to the second optical backplane. In other words, when the optical backplane is faulty, switchover may be performed from the faulty optical backplane to the spare optical backplane. In this way, normal transmission of an optical signal is ensured without replacing the entire optical communication device, thereby simplifying maintenance.

10 Claims, 3 Drawing Sheets

(58) Field of Classification Search
CPC .. H04Q 1/32; H04Q 1/40; H04Q 3/04; H04Q
3/18; H04Q 3/32; H04Q 3/42; H04Q
3/58; H04Q 3/64; H04Q 3/72; H04Q
5/18; H04Q 5/02; H04Q 9/08; H04Q
9/14; H04Q 11/04; H04Q 1/444; H04Q
3/20; H04Q 3/24; H04Q 3/48; H04Q
3/54; H04Q 1/44
See application file for complete search history.

(56) References Cited

U.S. PATENT DOCUMENTS

| | | | | |
|---|---|---|---|---|
| 2003/0039014 A1* | 2/2003 | English | H04B 10/801 | 398/164 |
| 2003/0215175 A1* | 11/2003 | Alavie | H04J 14/0213 | 385/24 |
| 2004/0208453 A1* | 10/2004 | Jacobowitz | G02B 6/30 | 398/164 |
| 2005/0191056 A1* | 9/2005 | Coffey | H04J 14/02 | 398/79 |
| 2006/0062512 A1* | 3/2006 | Lee | G02B 6/43 | 385/88 |
| 2007/0266192 A1* | 11/2007 | Campini | G06F 13/409 | 710/301 |
| 2009/0140755 A1* | 6/2009 | Byers | H04B 10/803 | 324/763.01 |
| 2012/0195548 A1* | 8/2012 | Brunner | H05K 1/14 | 385/16 |
| 2013/0151812 A1* | 6/2013 | Colgan | G06F 15/17337 | 712/E9.002 |
| 2014/0293998 A1 | 10/2014 | Cheung et al. | | |
| 2016/0212510 A1* | 7/2016 | Bogoni | H04J 14/07 | |
| 2016/0299303 A1* | 10/2016 | Millar | G02B 6/428 | |
| 2017/0075848 A1* | 3/2017 | Leopardi | G06F 13/4068 | |
| 2017/0357068 A1* | 12/2017 | Finkman | G02B 6/4214 | |

OTHER PUBLICATIONS

Ashok V. Krishnamoorthy et al., "Progress in Low-Power Switched Optical Interconnects," Dec. 5, 2010, IEEE Journal of Selected Topics in Quantum Electronics, vol. 17, No. 2, Mar./Apr. 2011, pp. 357-370.*

* cited by examiner

OPTICAL BACKPLANE SWITCHOVER METHOD AND OPTICAL COMMUNICATION DEVICE

CROSS-REFERENCE TO RELATED APPLICATIONS

This application is a continuation of International Application No. PCT/CN2022/130204, filed on Nov. 7, 2022, which claims priority to Chinese Patent Application No. 202111339864.2, filed on Nov. 12, 2021. The disclosures of the aforementioned applications are hereby incorporated by reference in their entireties.

TECHNICAL FIELD

This disclosure relates to the optical communication field, and in particular, to an optical backplane switchover method and an optical communication device.

BACKGROUND

In an optical communication device, an optical backplane plays a role of connecting optical signal processing boards in the device. Each optical signal processing board is connected to the optical backplane through a connector, and the optical backplane may transmit an optical signal from one optical signal processing board to another optical signal processing board. As insertion of the optical signal processing boards into the optical backplane can achieve connection operations of a large quantity of optical fibers, space occupied by the device is reduced.

Currently, there is typically only one optical backplane on an optical communication device, and all optical signal processing boards are inserted into the optical backplane. If the optical backplane is faulty, the entire optical communication device needs to be replaced, resulting in high maintenance costs.

SUMMARY

Embodiments of this disclosure provide an optical backplane switchover method and an optical communication device. When an optical backplane is faulty, switchover may be performed from the faulty optical backplane to a spare optical backplane. In this way, normal transmission of an optical signal is ensured, and an entire optical communication device does not need to be replaced, thereby simplifying maintenance.

According to a first aspect, an embodiment of this disclosure provides an optical communication device. The optical communication device includes a first optical signal processing board, a second optical signal processing board, a first optical backplane, and a second optical backplane. The first optical signal processing board is connected to the first optical backplane through a first connector. The second optical signal processing board is connected to the first optical backplane through a second connector. The first optical signal processing board is connected to the second optical backplane through a third connector. The second optical signal processing board is connected to the second optical backplane through a fourth connector. A first optical signal processor and a first selector switch are disposed on the first optical signal processing board, and the first optical signal processor is connected to the first connector through the first selector switch. A second optical signal processor and a second selector switch are disposed on the second optical signal processing board, and the second optical signal processor is connected to the second connector through the second selector switch. Specifically, the first optical signal processing board and the second optical signal processing board are configured to determine whether a first optical link on the first optical backplane is faulty. The first optical link is configured to connect the first connector to the second connector. When the first optical signal processing board and the second optical signal processing board determine that the first optical link is faulty, the first optical signal processing board is configured to connect the first optical signal processor to the third connector through the first selector switch. The second optical signal processing board is configured to connect the second optical signal processor to the fourth connector through the second selector switch.

In this implementation, each optical signal processing board in the optical communication device is connected to at least two optical backplanes, where the first optical backplane is a currently working optical backplane, and the second optical backplane is a spare optical backplane. If the first optical link on the first optical backplane is faulty, a selector switch on the optical signal processing board is controlled to perform switching, to disconnect the optical signal processing board from the first optical backplane and connect the optical signal processing board to the second optical backplane. In other words, when the optical backplane is faulty, switchover may be performed from the faulty optical backplane to the spare optical backplane. In this way, normal transmission of an optical signal is ensured, and an entire optical communication device does not need to be replaced, thereby simplifying maintenance. In some possible implementations, the first optical signal processing board is orthogonally connected to the first optical backplane. The second optical signal processing board is orthogonally connected to the first optical backplane. The first optical signal processing board is orthogonally connected to the second optical backplane. The second optical signal processing board is orthogonally connected to the second optical backplane. This orthogonal connection design manner facilitates insertion and removal between an optical signal processing board and an optical backplane. In addition, space can be saved, so that more optical backplanes can be disposed to connect to each optical signal processing board.

In some possible implementations, the second optical backplane includes an optical switch array, and the second optical backplane is adapted to configure the optical switch array based on the first optical link, to form a second optical link. The second optical link is configured to connect the third connector to the fourth connector. It should be understood that, during actual application, a quantity of optical backplanes may alternatively be greater than 2. In addition, links on different working optical backplanes may be different. Therefore, the optical switch array is flexibly configured, so that the second optical link may be the same as a link on any working optical backplane. In this way, switchover can be performed on any faulty working optical backplane based on an actual situation.

In some possible implementations, there are a plurality of first optical backplanes, and the second optical backplane is a spare optical backplane for any one of the first optical backplanes, to improve protection efficiency and reduce impact of a fault.

In some possible implementations, the first optical backplane is detachably connected to both the first optical signal processing board and the second optical signal processing board. The second optical backplane is detachably connected to both the first optical signal processing board and the second optical signal processing board. This facilitates disassembly and repair of the faulty optical backplane after the switchover between the optical backplanes.

According to a second aspect, an embodiment of this disclosure provides an optical backplane switchover method. The method is applied to an optical communication device. The optical communication device includes a first optical signal processing board, a second optical signal processing board, a first optical backplane, and a second optical backplane. The first optical signal processing board is connected to the first optical backplane through a first connector. The second optical signal processing board is connected to the first optical backplane through a second connector. The first optical signal processing board is connected to the second optical backplane through a third connector. The second optical signal processing board is connected to the second optical backplane through a fourth connector. A first optical signal processor and a first selector switch are disposed on the first optical signal processing board, and the first optical signal processor is connected to the first connector through the first selector switch. A second optical signal processor and a second selector switch are disposed on the second optical signal processing board, and the second optical signal processor is connected to the second connector through the second selector switch.

The method includes the following steps: first, determining whether a first optical link on the first optical backplane is faulty, where the first optical link is configured to connect the first connector to the second connector; and further, when determining that the first optical link is faulty, connecting the first optical signal processor to the third connector through the first selector switch, and connecting the second optical signal processor to the fourth connector through the second selector switch.

In some possible implementations, the first optical signal processing board is orthogonally connected to the first optical backplane. The second optical signal processing board is orthogonally connected to the first optical backplane. The first optical signal processing board is orthogonally connected to the second optical backplane. The second optical signal processing board is orthogonally connected to the second optical backplane.

In some possible implementations, the second optical backplane includes an optical switch array. The method further includes: configuring the optical switch array based on the first optical link, to form a second optical link. The second optical link is configured to connect the third connector to the fourth connector.

In some possible implementations, the method further includes: determining whether the first optical link on the first optical backplane recovers from a fault; and when determining that the first optical link on the first optical backplane recovers from the fault, connecting the first optical signal processor to the first connector through the first selector switch, and connecting the second optical signal processor to the second connector through the second selector switch. In this implementation, if the faulty first optical backplane returns to normal after repair, switchover may be performed from the second optical backplane to the first optical backplane that recovers from the fault. In this way, the second optical backplane can be restored to a spare state, to be prepared for switchover, at any time, from another working optical backplane that may be faulty.

In some possible implementations, the method further includes: determining whether the second optical link is faulty; and when determining that the second optical link is faulty, sending a fault alarm. In this way, reliability of this solution is improved.

In this embodiment of this disclosure, each optical signal processing board in the optical communication device is connected to at least two optical backplanes, where the first optical backplane is a currently working optical backplane, and the second optical backplane is a spare optical backplane. If the first optical link on the first optical backplane is faulty, a selector switch on the optical signal processing board is controlled to perform switching, to disconnect the optical signal processing board from the first optical backplane and connect the optical signal processing board to the second optical backplane. In other words, when the optical backplane is faulty, switchover may be performed from the faulty optical backplane to the spare optical backplane. In this way, normal transmission of an optical signal is ensured, and an entire optical communication device does not need to be replaced, thereby simplifying maintenance.

DESCRIPTION OF EMBODIMENTS

Embodiments of this disclosure provide an optical backplane switchover method and an optical communication device. When an optical backplane is faulty, switchover is performed from the faulty optical backplane to a spare optical backplane. In this way, normal transmission of an optical signal is ensured, and an entire optical communication device does not need to be replaced, thereby simplifying maintenance.

It should be noted that, in the specification, the claims, and the accompanying drawings of this disclosure, the terms "first", "second", and the like are intended to distinguish between similar objects but do not limit a specific order or sequence. It should be understood that the foregoing terms are interchangeable in appropriate cases, so that embodiments described in this disclosure can be implemented in a sequence other than the content described in this disclosure. In addition, the terms "include" and any other variant thereof are intended to cover a non-exclusive inclusion. For example, a process, a method, a system, a product, or a device that includes a list of steps or units is not necessarily limited to those expressly listed steps or units, but may include other steps or units not expressly listed or inherent to the process, the method, the product, or the device.

The optical communication device provided in this disclosure mainly includes an optical backplane and a plurality of optical signal processing boards. The optical backplane plays a role of connecting the optical signal processing boards. The optical backplane mainly includes a connector and a fiber optic board, and transmits an optical signal using a light guide material as a medium. Each optical signal processing board is connected to the optical backplane through the connector, and an optical signal output by one optical signal processing board may be transmitted to another optical signal processing board through the medium on the optical backplane. It should be noted that a type of the optical communication device provided in this disclosure includes but is not limited to an optical cross-connect (OXC) device, and a type of the optical signal processing board includes but is not limited to a line board, a tributary board, and a board. It should be further noted that, in some disclosure scenarios, the foregoing various types of "boards" may also be referred to as "cards", "disks", or the like. In this disclosure, the term "board" is uniformly used for description.

The following describes in detail the optical communication device provided in this disclosure.

Figure 1:
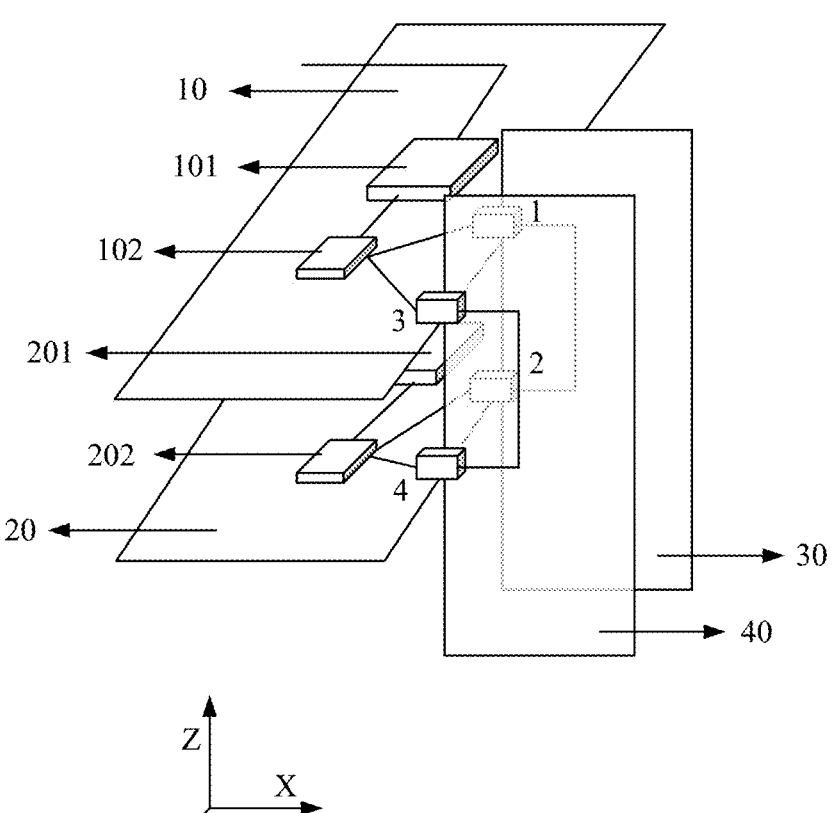
FIG. 1 is a schematic diagram of a first structure of an optical communication device according to an embodiment of this disclosure.

FIG. 1 is a schematic diagram of a first structure of an optical communication device according to an embodiment of this disclosure. As shown in FIG. 1, the optical communication device includes a first optical signal processing board 10, a second optical signal processing board 20, a first optical backplane 30, and a second optical backplane 40. The first optical signal processing board 10 is connected to the first optical backplane 30 through a first connector 1. The second optical signal processing board 20 is connected to the first optical backplane 30 through a second connector 2. The first optical signal processing board 10 is connected to the second optical backplane 40 through a third connector 3. The second optical signal processing board 20 is connected to the second optical backplane 40 through a fourth connector 4. It should be understood that the connectors shown in FIG. 1 may be classified into a male connector and a female connector. For example, the male connector in the connectors is disposed on the optical signal processing board, the female connector in the connectors is disposed on the optical backplane, and interconnection between the male connector and the female connector implements connection between the optical signal processing board and the optical backplane.

A first optical signal processor 101 and a first selector switch 102 are further disposed on the first optical signal processing board 10. A second optical signal processor 201 and a second selector switch 202 are disposed on the second optical signal processing board 20. The first optical signal processor 101 and the second optical signal processor 201 are both configured to implement functions such as receiving and sending, detection, and processing of an optical signal. The first selector switch 102 and the second selector switch 202 are both configured to connect optical links on different optical backplanes through switching. For example, a currently working optical backplane is the first optical backplane 30. The first optical signal processor 101 is connected to the first connector 1 through the first selector switch 102, and the second optical signal processor 201 is connected to the second connector 2 through the second selector switch 202. A first optical link on the first optical backplane 30 is configured to connect the first connector 1 to the second connector 2. Therefore, the first optical signal processor 101 and the second optical signal processor 201 currently send and receive an optical signal through the first optical link on the first optical backplane 30. It should be understood that the optical signal processor and the selector switch on each optical signal processing board may be independent of each other, or may be integrated together. This is not specifically limited herein.

It can be learned from the foregoing descriptions that each optical signal processing board is connected to two optical backplanes. One optical backplane serves as a working optical backplane; and the other optical backplane serves as a spare optical backplane, and is used for switchover from the working optical backplane when the working optical backplane is faulty. The following describes an optical backplane switchover method with reference to the optical communication device shown in FIG. 1.

For example, the currently working optical backplane is the first optical backplane 30. The first optical signal processing board 10 may determine, through detection, whether the first optical link on the first optical backplane 30 is faulty. For example, if the first optical signal processor 101 currently cannot detect an optical signal from the second optical signal processor 201, it is determined that the first optical link on the first optical backplane 30 is faulty. Similarly, the second optical signal processing board 20 may also determine, in a similar detection manner, whether the first optical link on the first optical backplane 30 is faulty. If the first optical link on the first optical backplane 30 is faulty, the first selector switch 102 and the second selector switch 202 may perform switching, to perform switchover from the first optical backplane 30 to the second optical backplane 40. Specifically, the first optical signal processor 101 is connected to the third connector 3 through the first selector switch 102. The second optical signal processor 201 is connected to the fourth connector 4 through the second selector switch 202. A second optical link on the second optical backplane 40 is configured to connect the third connector 3 to the fourth connector 4. Therefore, after the switchover between the first optical backplane 30 and the second optical backplane 40 is completed, the first optical signal processor 101 and the second optical signal processor 201 send and receive an optical signal through the second optical link on the second optical backplane 40.

In a specific implementation, a controller controls the first selector switch 102 and the second selector switch 202 to perform switching. For example, the controller may be disposed on a control board, and the control board is connected to both the first optical signal processing board 10 and the second optical signal processing board 20. A detailed accompanying drawing of the controller is not provided herein. The controller may obtain a fault detection result of the first optical backplane 30 fed back by the first optical signal processing board 10 or the second optical signal processing board 20. Further, when the first optical backplane 30 is faulty, the controller controls the first selector switch 102 and the second selector switch 202 to perform switching, to implement the switchover between the optical backplanes. It should be understood that the first selector switch 102 and the second selector switch 202 may both be controlled by one controller, or may be controlled by two different controllers respectively. This is not specifically limited herein.

It should be noted that, in this disclosure, the optical signal processing board and the optical backplane may be designed to be detachably connected, to facilitate disassembly and repair of the faulty optical backplane after the switchover between the optical backplanes. In a specific implementation, the optical signal processing board and the optical backplane board provided in this application are orthogonally connected. The following uses the first optical signal processing board 10 and the first optical backplane 30 shown in FIG. 1 as an example to describe a meaning of an orthogonal connection. Assuming that a plane on which the first optical signal processing board 10 is placed is parallel to a plane on which an X-axis and a Y-axis are located, and a plane on which the first optical backplane 30 is placed is parallel to a plane on which the X-axis and a Z-axis are located. The X-axis, the Y-axis, and the Z-axis are mutually perpendicular. In other words, the first optical signal processing board 10 may be parallel to the first optical backplane 30 after being rotated by 90 degrees around the X-axis. Similarly, as shown in FIG. 1, the second optical signal processing board 20 is orthogonally connected to the first optical backplane 30, the first optical signal processing board 10 is orthogonally connected to the second optical backplane 40, and the second optical signal processing board 20 is orthogonally connected to the second optical backplane 40.

It should be understood that, because the optical signal processing boards and the optical backplanes are all orthogonally connected, the foregoing connectors may be located at intersection points of the optical signal processing boards and the optical backplanes, to facilitate insertion and removal of the optical signal processing boards or the optical backplanes. During actual application, the optical signal processing boards and the optical backplanes may be disposed in a subrack. For example, the optical signal processing boards are horizontally inserted in the front of the subrack, and the optical backplanes are vertically inserted in the rear of the subrack. In addition, a guide rail may be configured for each of the optical signal processing boards and the optical backplanes in the subrack, to facilitate on-site insertion and removal of the optical backplanes and the optical signal processing boards.

In some possible implementations, the optical signal processing board and the optical backplane may alternatively be non-orthogonally connected. For example, based on the structure shown in FIG. 1, the optical signal processing board or the optical backplane may alternatively be appropriately offset or rotated, so that the optical signal processing board and the optical backplane are not completely orthogonal. Insertion and removal of the optical signal processing board and the optical backplane can also be implemented through this type of deformation. This also falls within the protection scope of this disclosure.

In some other possible implementations, the optical backplane may alternatively be designed to be non-detachably connected. For example, even if switchover between a spare optical backplane and a faulty optical backplane is performed, a connection between the faulty optical backplane and the optical signal processing board is still maintained. In other words, the faulty optical backplane does not need to be disassembled. The following provides a specific implementation with reference to the accompanying drawings.

Figure 2:
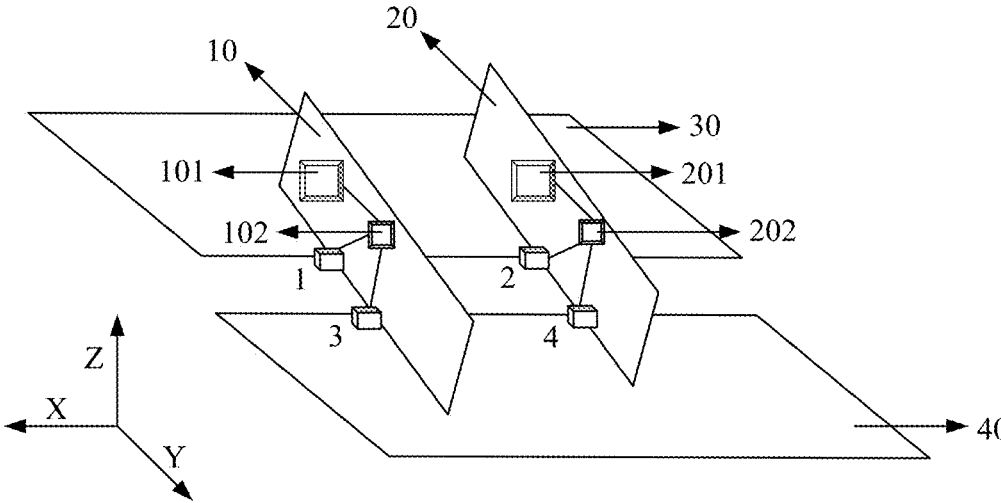
FIG. 2 is a schematic diagram of a second structure of an optical communication device according to an embodiment of this disclosure.

FIG. 2 is a schematic diagram of a second structure of an optical communication device according to an embodiment of this disclosure. As shown in FIG. 2, a plane on which the optical signal processing board is placed is perpendicular to, but is not orthogonally connected to a plane on which the optical backplane is placed. For example, the plane on which the first optical signal processing board 10 is placed is parallel to a plane on which the Y-axis and the Z-axis are located, and the plane on which the first optical backplane 30 is placed is parallel to the plane on which the X-axis and the Y-axis are located. The X-axis, the Y-axis, and the Z-axis are mutually perpendicular. In other words, the first optical signal processing board 10 may be parallel to the first optical backplane 30 after being rotated by 90 degrees around the Y-axis. In this implementation, the optical signal processing board may also be connected to a plurality of optical backplanes.

Figures 3, 4:
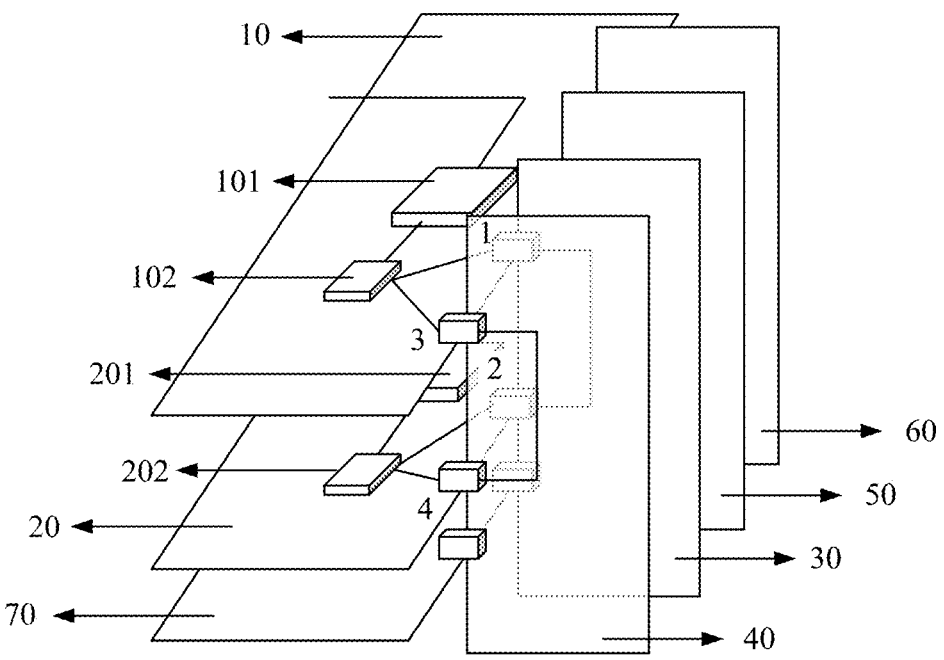
FIG. 3 is a schematic diagram of a third structure of an optical communication device according to an embodiment of this disclosure.
FIG. 4 is a schematic diagram of a fourth structure of an optical communication device according to an embodiment of this disclosure.

FIG. 3 is a schematic diagram of a third structure of an optical communication device according to an embodiment of this disclosure. During actual application, a quantity of optical backplanes may alternatively be greater than 2, and a quantity of optical signal processing boards may alternatively be greater than 2. For example, as shown in FIG. 3, the optical communication device further includes a third optical backplane 50, a fourth optical backplane 60, and a third optical signal processing board 70. A structure of the third optical signal processing board 70 is similar to a structure of the first optical signal processing board 10 or the second optical signal processing board 20 described in the embodiment shown in FIG. 1. Details are not described herein again. The first optical backplane 30, the third optical backplane 50, and the fourth optical backplane 60 are all working optical backplanes. Switchover may be performed from any one of the foregoing working optical backplanes to the second optical backplane 40, to implement a 1:n protection solution. This solution improves protection efficiency and reduces impact of a fault. For a specific switchover method, refer to related descriptions of the embodiment shown in FIG. 1. Details are not described herein again. It should be understood that there may alternatively be a plurality of spare optical backplanes. This is not specifically limited herein.

It should be noted that the 1:n protection solution described in the embodiment shown in FIG. 3 is applicable to a scenario in which all working optical backplanes are the same. Therefore, only one spare optical backplane that is the same as the working optical backplane needs to be prepared for switchover of any working optical backplane. However, in some possible application scenarios, links on different working optical backplanes may alternatively be different. Therefore, in this application, an optical switch array may be further considered to be disposed on a spare optical backplane, and may be flexibly configured as a link on any working optical backplane, to implement switchover of any working optical backplane. The following describes this implementation in detail with reference to the accompanying drawings.

FIG. 4 is a schematic diagram of a fourth structure of an optical communication device according to an embodiment of this disclosure. As shown in FIG. 4, an optical switch array 401 is disposed on the second optical backplane 40. The second optical link on the second optical backplane 40 may be changed by configuring the optical switch array 401. Using FIG. 4 as an example, the second optical link may connect the first optical signal processing board 10 to the second optical signal processing board 20. Alternatively, the second optical link may connect the first optical signal processing board 10 to the third optical signal processing board 70. Alternatively, the second optical link may connect the second optical signal processing board 20 to the third optical signal processing board 70. In other words, three different link forms may be obtained by configuring the optical switch array 401.

Figure 5:
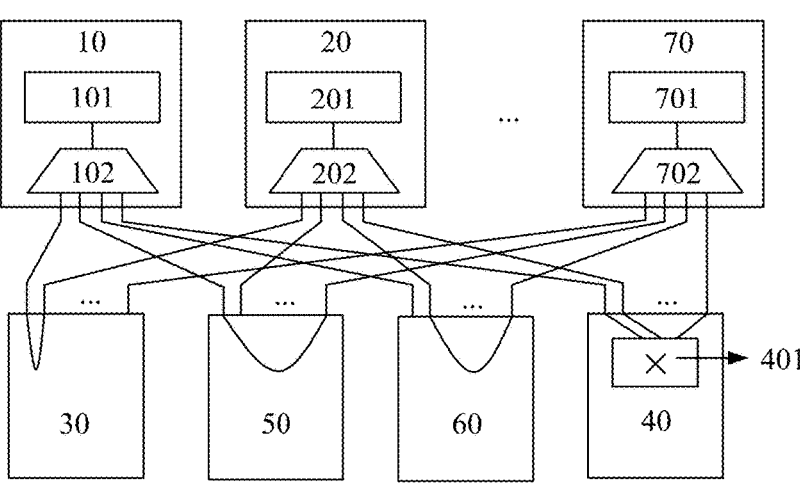
FIG. 5 is a schematic diagram of configuring an optical link through an optical switch array according to an embodiment of this disclosure.

FIG. 5 is a schematic diagram of configuring an optical link through an optical switch array according to an embodiment of this disclosure. As shown in FIG. 5, links on three working optical backplanes, namely, the first optical backplane 30, the third optical backplane 50, and the fourth optical backplane 60, are different. An optical link on the first optical backplane 30 is configured to connect the first optical signal processing board 10 to the second optical signal processing board 20. An optical link on the third optical backplane 50 is configured to connect the first optical signal processing board 10 to the third optical signal processing board 70. An optical link on the fourth optical backplane 60 is configured to connect the second optical signal processing board 20 to the third optical signal processing board 70. Therefore, the optical switch array 401 may be flexibly configured, so that the second optical link may be the same as a link on any working optical backplane. In this way, switchover can be performed on any faulty working optical backplane based on an actual situation.

In a specific implementation, the optical switch array 401 on the second optical backplane 40 may alternatively be controlled by the controller described in the embodiment shown in FIG. 1. For example, the controller may configure the optical switch array 401 based on a fault condition of any working optical backplane obtained by the controller, so that the optical link on the second optical backplane 40 is the same as an optical link on the faulty optical backplane.

The foregoing describes the optical communication device provided in embodiments of this disclosure, and the following describes an optical backplane switchover method provided in embodiments of this disclosure.

Figure 6:
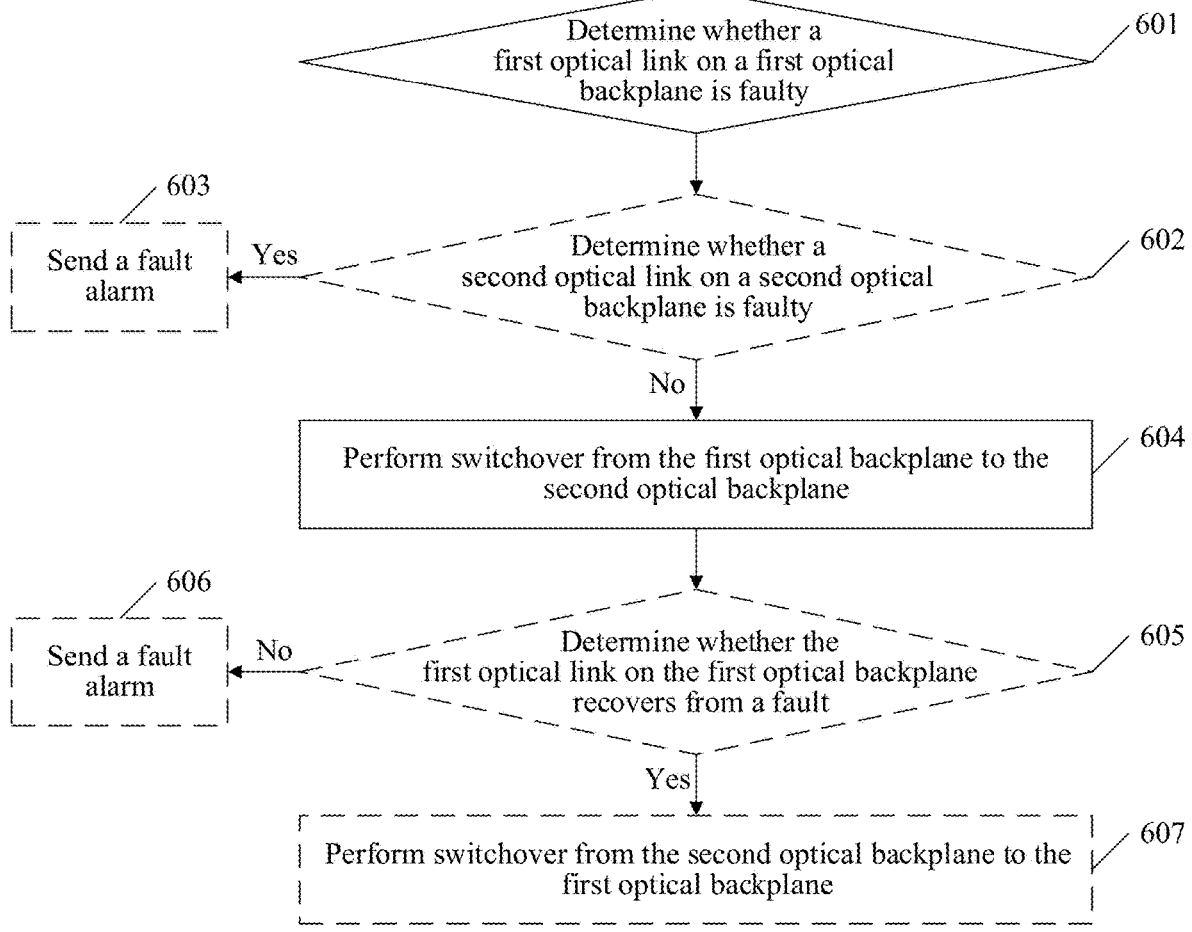
FIG. 6 is a schematic flowchart of an optical backplane switchover method according to an embodiment of this disclosure.

FIG. 6 is a schematic flowchart of an optical backplane switchover method according to an embodiment of this disclosure. It should be noted that the optical backplane switchover method is implemented based on the optical communication device described in any one of the foregoing embodiments. For a structure of the optical communication device, refer to related descriptions of any one of the foregoing embodiments. Details are not described herein again. In this example, the optical backplane switchover method includes the following steps.

601: Determine whether a first optical link on a first optical backplane is faulty, and if yes, perform step 602.

It should be understood that the first optical backplane is a currently working optical backplane, and an optical signal is transmitted between a first optical signal processing board and a second optical signal processing board through the first optical link on the first optical backplane. For example, the first optical signal processing board and the second optical signal processing board may detect whether the first optical signal processing board and the second optical signal processing board each can receive an optical signal. If no optical signal is detected, it may be determined that the first optical link on the first optical backplane is faulty. Further, the first optical signal processing board and the second optical signal processing board send a fault alarm.

602: Determine whether a second optical link on a second optical backplane is faulty, and if yes, perform step 603, or if no, perform step 604.

In some possible implementations, the second optical backplane serves as a spare optical backplane. Before switchover is performed on the faulty first optical backplane, whether the second optical link on the second optical backplane is faulty further needs to be determined.

603: Send a fault alarm.

If it is detected that the second optical link on the second optical backplane is faulty, the fault alarm is sent.

604: Perform switchover from the first optical backplane to the second optical backplane.

If the first optical link on the first optical backplane is faulty and the second optical link on the second optical backplane is not faulty, switchover may be performed from the first optical backplane to the spare second optical backplane. Using the optical communication device shown in FIG. 1 as an example, the first optical signal processor 101 is connected to the third connector 3 through the first selector switch 102. The second optical signal processor 201 is connected to the fourth connector 4 through the second selector switch 202. The second optical link on the second optical backplane 40 is configured to connect the third connector 3 to the fourth connector 4. After the switchover between the first optical backplane 30 and the second optical backplane 40 is completed, the first optical signal processor 101 and the second optical signal processor 201 send and receive an optical signal through the second optical link on the second optical backplane 40.

In some possible implementations, if the optical communication device shown in FIG. 4 is used, that is, an optical switch array is further disposed on the second optical backplane, the optical switch array needs to be configured first, so that the second optical link on the second optical backplane is the same as the first optical link on the first optical backplane. Then, switchover between the second optical backplane and the first optical backplane is performed.

605: Determine whether the first optical link on the first optical backplane recovers from a fault, and if no, perform step 606, or if yes, perform step 607.

In some possible implementations, the faulty optical backplane may be disassembled and sent for inspection and repair. When the repaired first optical backplane is re-inserted, whether the repaired optical backplane recovers from the fault needs to be determined first. In this way, whether switchover can be performed on the currently working second optical backplane is determined.

606: Send a fault alarm.

If the first optical link on the first optical backplane is still not recovered from the fault, the fault alarm is sent.

607: Perform switchover from the second optical backplane to the first optical backplane.

If it is detected that a first optical link on the repaired first optical backplane is normal, switchover may be performed from the second optical backplane to the repaired first optical backplane. In this way, the second optical backplane can be restored to a spare state, to be prepared for switchover, at any time, from another working optical backplane that may be faulty. A specific switchover method may be considered as a reverse process of the switchover manner described in step 604. Details are not described herein again.

In some possible implementations, if the optical communication device shown in FIG. 4 is used, that is, an optical switch array is further disposed on the second optical backplane, after switchover is performed from the second optical backplane to the repaired first optical backplane, a current configuration of the optical switch array may be cleared. In this way, the second optical backplane is restored to a spare state, and the optical switch array is reconfigured when switchover is required next time.

In this embodiment of this disclosure, each optical signal processing board in the optical communication device is connected to at least two optical backplanes, where the first optical backplane is a currently working optical backplane, and the second optical backplane is a spare optical backplane. If the first optical link on the first optical backplane is faulty, a selector switch on the optical signal processing board is controlled to perform switching, to disconnect the optical signal processing board from the first optical backplane and connect the optical signal processing board to the second optical backplane. In other words, when the optical backplane is faulty, switchover may be performed from the faulty optical backplane to the spare optical backplane. In this way, normal transmission of an optical signal is ensured, and an entire optical communication device does not need to be replaced, thereby simplifying maintenance.

What is claimed is:

1. An optical communication device, comprising a first optical signal processing board, a second optical signal processing board, a first optical backplane, and a second optical backplane, wherein the first optical signal processing board is connected to the first optical backplane through a first connector, the second optical signal processing board is connected to the first optical backplane through a second connector, the first optical signal processing board is connected to the second optical backplane through a third connector, the second optical signal processing board is connected to the second optical backplane through a fourth connector, a first optical signal processor and a first selector switch are disposed on the first optical signal processing board, the first optical signal processor is connected to the first connector through the first selector switch, a second optical signal processor and a second selector switch are disposed on the second optical signal processing board, and the second optical signal processor is connected to the second connector through the second selector switch;

the first optical signal processing board and the second optical signal processing board are configured to determine whether a first optical link on the first optical backplane is faulty, and the first optical link is configured to connect the first connector to the second connector; and when the first optical signal processing board and the second optical signal processing board determine that the first optical link is faulty, the first optical signal processing board is configured to connect the first optical signal processor to the third connector through the first selector switch, and the second optical signal processing board is configured to connect the second optical signal processor to the fourth connector through the second selector switch.

2. The optical communication device according to claim 1, wherein the first optical signal processing board is orthogonally connected to the first optical backplane, the second optical signal processing board is orthogonally connected to the first optical backplane, the first optical signal processing board is orthogonally connected to the second optical backplane, and the second optical signal processing board is orthogonally connected to the second optical backplane.

3. The optical communication device according to claim 1, wherein the second optical backplane comprises an optical switch array, the second optical backplane is adapted to configure the optical switch array based on the first optical link to form a second optical link, and the second optical link is configured to connect the third connector to the fourth connector.

4. The optical communication device according to claim 1, wherein there are a plurality of first optical backplanes, and the second optical backplane is a spare optical backplane for any one of the plurality of first optical backplanes.

5. The optical communication device according to claim 1, wherein the first optical backplane is detachably connected to both the first optical signal processing board and the second optical signal processing board, and the second optical backplane is detachably connected to both the first optical signal processing board and the second optical signal processing board.

6. An optical backplane switchover method, wherein the method is applied to an optical communication device; the optical communication device comprises a first optical signal processing board, a second optical signal processing board, a first optical backplane, and a second optical backplane, the first optical signal processing board is connected to the first optical backplane through a first connector, the second optical signal processing board is connected to the first optical backplane through a second connector, the first optical signal processing board is connected to the second optical backplane through a third connector, the second optical signal processing board is connected to the second optical backplane through a fourth connector, a first optical signal processor and a first selector switch are disposed on the first optical signal processing board, the first optical signal processor is connected to the first connector through the first selector switch, a second optical signal processor and a second selector switch are disposed on the second optical signal processing board, and the second optical signal processor is connected to the second connector through the second selector switch; and the method comprises:

determining whether a first optical link on the first optical backplane is faulty, wherein the first optical link is configured to connect the first connector to the second connector; and when it is determined that the first optical link is faulty, connecting the first optical signal processor to the third connector through the first selector switch, and connecting the second optical signal processor to the fourth connector through the second selector switch.

7. The method according to claim 6, wherein the first optical signal processing board is orthogonally connected to the first optical backplane, the second optical signal processing board is orthogonally connected to the first optical backplane, the first optical signal processing board is orthogonally connected to the second optical backplane, and the second optical signal processing board is orthogonally connected to the second optical backplane.

8. The method according to claim 6, wherein the second optical backplane comprises an optical switch array, and the method further comprises:

configuring the optical switch array based on the first optical link to form a second optical link, wherein the second optical link is configured to connect the third connector to the fourth connector.

9. The method according to claim 6, wherein the method further comprises:

determining whether the first optical link on the first optical backplane recovers from a fault; and when it is determined that the first optical link on the first optical backplane recovers from the fault, connecting the first optical signal processor to the first connector through the first selector switch, and connecting the second optical signal processor to the second connector through the second selector switch.

10. The method according to claim 6, wherein the method further comprises:

determining whether the second optical link is faulty; and when it is determined that the second optical link is faulty, sending a fault alarm.

* * * * *